(12) United States Patent
France et al.

(10) Patent No.: US 10,550,549 B2
(45) Date of Patent: *Feb. 4, 2020

(54) AUGMENTED REALITY DISPLAY FOR MATERIAL MOVING MACHINES

(71) Applicant: Caterpillar Trimble Control Technologies LLC, Dayton, OH (US)

(72) Inventors: Peter France, Christchurch (NZ); Gun Lee, Magill (AU); Mark Billinghurst, Mawson Lakes (AU)

(73) Assignee: Caterpillar Trimble Control Technologies LLC, Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/376,126

(22) Filed: Apr. 5, 2019

(65) Prior Publication Data

US 2019/0249398 A1 Aug. 15, 2019

Related U.S. Application Data

(63) Continuation of application No. 15/910,121, filed on Mar. 2, 2018, now Pat. No. 10,301,798.

(Continued)

(51) Int. Cl.
*E02F 9/26* (2006.01)
*B60R 1/00* (2006.01)
*E02F 9/22* (2006.01)
*G06T 19/00* (2011.01)
*E02F 3/32* (2006.01)
*E02F 3/43* (2006.01)
(Continued)

(52) U.S. Cl.
CPC ................ *E02F 9/261* (2013.01); *B60R 1/00* (2013.01); *E02F 3/32* (2013.01); *E02F 3/435* (2013.01); *E02F 9/2271* (2013.01); *E02F 9/245* (2013.01); *E02F 9/262* (2013.01); *E02F 9/264* (2013.01); *E02F 9/265* (2013.01); *G06T 19/006* (2013.01); *B60R 2300/305* (2013.01); *G06T 17/00* (2013.01)

(58) Field of Classification Search
CPC ........... E02F 9/261; E02F 3/435; E02F 3/245; G06T 19/006
See application file for complete search history.

(56) References Cited

U.S. PATENT DOCUMENTS 6,735,888 B2 5/2004 Green et al.
8,689,471 B2 4/2014 Carpenter et al.
(Continued)

OTHER PUBLICATIONS

Digpilot, "Wireless Excavator Guidance with GPS/GNSS"; www.digpilot.com.
(Continued)

*Primary Examiner* — Ryan R Yang
(74) *Attorney, Agent, or Firm* — Dinsmore & Shohl LLP

(57) ABSTRACT

A material moving machine including an implement, a camera, an augmented display, and a controller. The controller is programmed to store a three-dimensional model of underground features of terrain, capture an implement image comprising the implement and terrain, generate a superimposed image by superimposing corresponding portions of the implement image and the three-dimensional model of underground features, overlay a virtual trench on the superimposed image to generate an augmented reality overlay image, generate the augmented reality overlay image, and display the augmented reality overlay image on the augmented display.

20 Claims, 8 Drawing Sheets

Related U.S. Application Data

(60) Provisional application No. 62/466,542, filed on Mar. 3, 2017.

(51) Int. Cl.
*E02F 9/24* (2006.01)
*G06T 17/00* (2006.01)

(56) References Cited

U.S. PATENT DOCUMENTS

| | | |
|---|---|---|
| 8,918,246 B2 | 12/2014 | Friend |
| 9,428,885 B2 | 8/2016 | Nau |
| 9,824,490 B1 | 11/2017 | Cote et al. |
| 2008/0000111 A1 | 1/2008 | Green |
| 2008/0047170 A1 | 2/2008 | Nichols |
| 2008/0180523 A1 | 7/2008 | Stratton et al. |
| 2013/0333364 A1 | 12/2013 | Carpenter et al. |
| 2014/0188333 A1 | 7/2014 | Friend |
| 2015/0199106 A1 | 7/2015 | Johnson |
| 2016/0076228 A1 | 3/2016 | Nau |
| 2017/0120820 A1 | 5/2017 | Petzold et al. |
| 2017/0292248 A1 | 10/2017 | Matson et al. |

OTHER PUBLICATIONS

Digpilot, "Wireless Excavator Guidance", www.digpilot.com.
Topcon, "X-63/X-63li 3D Machine Control for Excavators"; topconpositioning.com/x63.
Schall, Gerhard, et al., "Smart Vidente: advances in mobile augmented reality for interactive visualization of underground infrastructure", Published in Journal Personal and Ubiquitous Computing, vol. 17, Issue 7, Oct. 2013, pp. 1533-1549.
"EC140E Volvo Crawler Excavators", Volve Construction Equipment, www.volvoce.com/na.
International Search Report and Written Opinion relating to International Application No. PCT/US2018/020579 dated Jun. 28, 2018.
"Augmented Reality for Subsurface Utilities: Further Improving Perception" http://communities.bentley.com/other/old_site_member_blogs/bentley_employees/b/stephanecotes_blog/archive/2012/06/18/augmented-reality-for-subsurface-utilities-further-improving-perception.

AUGMENTED REALITY DISPLAY FOR MATERIAL MOVING MACHINES

CROSS-REFERENCE TO RELATED APPLICATIONS

The present application is a continuation of U.S. patent application Ser. No. 15/910,121, entitled "Augmented Reality Display for Material Moving Machines," and filed on Mar. 2, 2018, which claims priority to U.S. Pat. App. No. 62/466,542, entitled "Augmented Reality Display for Excavators," and filed on Mar. 3, 2017, the entireties of each of which are incorporated by reference herein.

BACKGROUND

The present disclosure relates to material moving machines and, in some embodiments, to material moving machines including material moving implements, such as excavators including excavating implements. Such excavators, for the purposes of defining and describing the scope of the present application, comprise an excavator boom and an excavator stick subject to swing and curl, and an excavating implement that is subject to swing and curl control with the aid of the excavator boom and excavator stick, or other similar components for executing swing and curl movement. For example, and not by way of limitation, many types of excavators comprise a hydraulically or pneumatically or electrically controlled excavating implement that can be manipulated by controlling the swing and curl functions of an excavating linkage assembly of the excavator. Excavator technology is, for example, well represented by the disclosures of U.S. Pat. No. 8,689,471, which is assigned to Caterpillar Trimble Control Technologies LLC and discloses methodology for sensor-based automatic control of an excavator, US 2008/0047170, which is assigned to Caterpillar Trimble Control Technologies LLC and discloses an excavator 3D laser system and radio positioning guidance system configured to guide a cutting edge of an excavator bucket with high vertical accuracy, and US 2008/0000111, which is assigned to Caterpillar Trimble Control Technologies LLC and discloses methodology for an excavator control system to determine an orientation of an excavator sitting on a sloped site, for example.

BRIEF SUMMARY

According to the subject matter of the present disclosure, an excavator comprises a machine chassis, an excavating linkage assembly, an excavating implement, a camera, a display, and guidance architecture, wherein the excavating linkage assembly comprises an excavator boom and an excavator stick that collectively define a plurality of linkage assembly positions. The excavating linkage assembly is configured to swing with, or relative to, the machine chassis. The excavator stick is configured to curl relative to the excavator boom. The excavating implement is mechanically coupled to the excavator stick. The camera is positioned on the excavator such that a field of view of the camera encompasses a view of the excavating implement and a terrain. The guidance architecture comprises one or more dynamic sensors, one or more linkage assembly actuators configured to actuate the excavating linkage assembly through the plurality of linkage assembly positions, and an architecture controller.

In accordance with embodiments of the present disclosure, the architecture controller is programmed to generate a camera image from the camera, the camera image comprising the excavating implement in relation to the terrain, generate a virtual implement bar configured to be disposed as on a leading edge of the excavating implement, generate a virtual target bar of a design surface configured to be disposed as part of the terrain at least partially based on a position of the excavating implement, overlay the virtual implement bar and the virtual target bar on the camera image to generate an augmented reality overlay image, and display the augmented reality overlay image on the display.

In accordance with other embodiments of the present disclosure, the architecture controller is programmed to generate a camera image from the camera, the camera image comprising the excavating implement in relation to the terrain, generate a virtual trench configured to be disposed as part of the terrain at least partially based on a position of the excavating implement, superimpose the virtual trench on the camera image to generate an augmented reality overlay image, and display the augmented reality overlay image on the display.

In accordance with yet other embodiments of the present disclosure, the architecture controller is programmed to store geometry data of underground features of the terrain, generate a camera image from the camera, the camera image comprising the excavating implement in relation to the terrain, and generate a virtual trench configured to be disposed as part of the terrain at least partially based on the superimposed portion of a position of the excavating implement. The architecture controller is further programmed to generate a superimposed image of the virtual trench on the camera image, overlay the underground features within the virtual trench on the superimposed image to generate an augmented reality overlay image, and display the augmented reality overlay image on the display.

In accordance with embodiments of the present disclosure, a method of operating an excavator as shown and described herein is within the scope of this disclosure.

According to the subject matter of the present disclosure, a material moving machine comprises a material moving implement, a camera positioned on the material moving machine and comprising a field of view that encompasses the material moving implement and terrain in a working area of the material moving implement, an augmented display, and one or more dynamic sensors configured to generate a position signal representing a position of the material moving implement and an architecture controller. The architecture controller is programmed to store a three-dimensional model of underground features of terrain in at least the working area of the material moving implement, capture an implement image with the camera, the implement image comprising the material moving implement and terrain in at least the working area of the material moving implement, generate a superimposed image by superimposing corresponding portions of the implement image and the three-dimensional model of underground features, overlay a virtual trench on the superimposed image to generate an augmented reality overlay image and display the augmented reality overlay image on the augmented display.

In according with one other embodiment of the present disclosure, an excavator comprises an excavating implement, a camera positioned on the excavator and comprising a field of view that encompasses the excavating implement and terrain in the working area of the excavating implement, and control architecture comprising one or more dynamic sensors configured to generate a position signal representing a position of the excavating implement and an architecture controller. The architecture controller is programmed to store a three-dimensional model of underground features of terrain in at least the working area of the material moving implement, capture an implement image with the camera, the implement image comprising the excavating implement and terrain in at least the working area of the excavating implement, generate a superimposed image by superimposing corresponding portions of the implement image and the three-dimensional model of underground features, and overlay a virtual trench on the superimposed image to generate an augmented reality overlay image, and display the augmented reality overlay image on the augmented display.

In accordance with another embodiment of the present disclosure, a method of operating a material moving machine utilizing an augmented display comprises disposing the material moving machine on terrain, the material moving machine comprising a material moving implement, a camera, the augmented display, and control architecture. The camera is positioned on the excavator and comprises a field of view that encompasses the material moving implement and terrain in a working area of the material moving implement, and the control architecture comprises one or more dynamic sensors configured to generate a position signal representing a position of the material moving implement. The method further comprises storing a three-dimensional model of underground features of terrain in at least the working area of the material moving implement, capturing an implement image with the camera, the implement image comprising the material moving implement and terrain in at least the working area of the material moving implement, generating a superimposed image by superimposing corresponding portions of the implement image and the three-dimensional model of underground features, overlaying a virtual trench on the superimposed image to generate an augmented reality overlay image and displaying the augmented reality overlay image on the augmented display.

Although the concepts of the present disclosure are described herein with primary reference to the excavator illustrated in FIG. 1 as a material moving machine, it is contemplated that the concepts will enjoy applicability to any type of material moving machine, regardless of its particular mechanical configuration. For example, and not by way of limitation, the concepts may enjoy applicability to a backhoe loader including a backhoe linkage.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
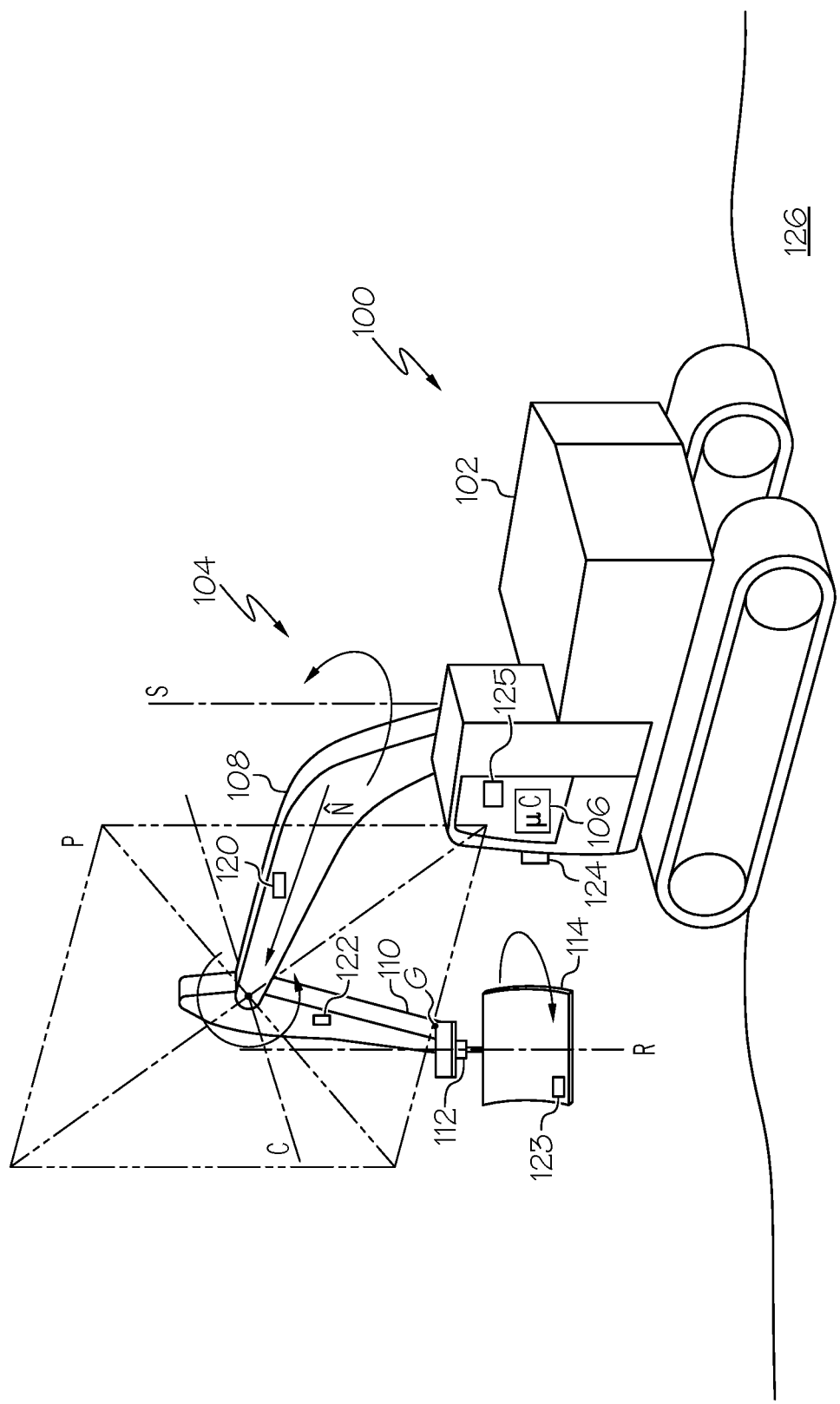
FIG. 1 illustrates an excavator incorporating aspects of the present disclosure.

The present disclosure relates to material moving machines configured to execute material moving tasks such as those involving material moving operations. For the purposes of the present disclosure, a material moving machine comprises a material moving implement and is designed to excavate, distribute, smooth, or otherwise move a material using the material moving implement. Examples of such machines include, but are not limited to, excavators, backhoe loaders, dozers, pavers, motor graders, loaders, trenchers, scrapers, drills, crushers, draglines, or any type of machine that includes an implement for moving material. Contemplated materials include, but are not limited to, soil or other surface-based earth materials, subterranean materials, including materials to be mined, and construction aggregates, including, for example, substrate materials and paving materials.

More particularly, the material moving machines may be excavators including components subject to adaptive control. For example, and not by way of limitation, many types of excavators typically have a hydraulically controlled material moving implement that can be manipulated by a joystick or other means in an operator control station of the machine, and is also subject to partially or fully automated adaptive control. The user of the machine may control the lift, tilt, angle, and pitch of the implement. In addition, one or more of these variables may also be subject to partially or fully automated control based on information sensed or received by an adaptive environmental sensor of the machine.

In the embodiments described herein, an excavator comprises a display configured to display an augmented reality overlay image including a virtual implement bar, a virtual target bar of a design surface, and/or a virtual trench. In embodiments, the virtual trench comprises underground features. In other embodiments, the virtual trench may not comprise underground features. The virtual trench is adjustably positioned automatically based on a position of an excavating implement. For example, the position of the excavator implement is captured by a camera of the excavator and/or determined through signals from one or more dynamic sensors, as described in greater detail further below. Alternatively or additionally, the virtual trench is adjustably positioned automatically based on rotation of the excavator. Such an augmented reality overlay image may be utilized by an excavator control and/or excavator operator to operate the excavator. For example, with respect to the excavator operator's camera view of a real world, the physical terrain image is augmented by virtual data to present the excavator operator with an augmented reality camera view as the augmented reality overlap image described in greater detail further below.

In embodiments, the virtual trench may be intended to representative of an actual ditch to be dug. In other embodiments, the virtual trench may not be intended to be representative of an actual ditch to be dug but rather be intended to visualize subsurface features including the design surface in a manner that enables intuitive depth perception by utilizing an operator's understanding of a size and location of the excavating implement. Thus, the virtual trench may be representative of a trench that would be dug if the excavating implement were to dig vertically down from a current location to the design surface and then pull in towards the excavator along the design surface. In some embodiments, the virtual trench has a same width as a leading implement edge of the excavating implement and is disposed with the leading implement edge oriented in a direction towards the center of the excavator. Further, as the excavating implement moves in to or away from the operator and/or as the excavator rotates (i.e., slews), the virtual trench adjustably moves, as described in greater detail further below.

In embodiments, generation of the virtual trench is at least partially based on terrain surface location to position and display lines representing a top of the virtual trench on a terrain surface, which terrain surface location may be estimated or measured. For example, a roll and pitch of the excavator may be projected to form a plane surface in front of the excavator to utilize as the terrain surface location. Additionally or alternatively, a surface scanner may be used such as a LIDAR, RADAR, or photogrammetry based scanner for such terrain surface location data. Further, GNSS-based vehicle mapping may used to measure the terrain surface as the material moving machine moves around the site (also known as track mapping), the terrain surface may be estimated by measuring the movement of the implement, and/or at least one of terrain data from manual and aerial surveys may be used that is transferred to and stored by the guidance architecture of the excavator.

Referring initially to FIG. 1, an excavator 100 comprises a machine chassis 102, an excavating linkage assembly 104, an excavating implement 114, a camera 124, a display 125, and guidance architecture 106. In embodiments, the guidance architecture comprises control architecture responsive to operator action through manual control of levers and/or linkages and/or responsive to automatic action by a controller of the excavator 100. The excavating linkage assembly 104 comprises an excavator boom 108 and an excavator stick 110 that collectively define a plurality of linkage assembly positions. The camera 124 is positioned on the excavator 100 such that a field of view of the camera 124 encompasses a view of the excavating implement 114 and a terrain 126.

In embodiments, the excavator 100 comprises a boom dynamic sensor 120, a stick dynamic sensor 122, an implement dynamic sensor 123, or combinations thereof. The boom dynamic sensor 120 is positioned on the excavator boom 108, the stick dynamic sensor 122 is positioned on the excavator stick 110, and the implement dynamic sensor 123 is positioned on the excavating implement 114. The dynamic sensor 120, 122, 123 may comprise a global navigation satellite system (GNSS) receiver, a global positioning system (GPS) receiver, a Universal Total Station (UTS) and machine target, an inertial measurement unit (IMU), an inclinometer, an accelerometer, a gyroscope, an angular rate sensor, a rotary position sensor, a position sensing cylinder, or combinations thereof, or any sensor or combination of sensors that provide signals indicative of an operational characteristic of a component of the material moving machine such as the excavator 100. For example, the dynamic sensor 120, 122, 123 may comprise an IMU comprising a 3-axis accelerometer and a 3-axis gyroscope. The dynamic sensor 120, 122, 123 may include x-axis, y-axis, and z-axis acceleration values.

The excavating linkage assembly 104 may be configured to define a linkage assembly heading N and to swing with, or relative to, the machine chassis 102 about a swing axis S of the excavator 100. The excavator stick 110 is configured to curl relative to the excavator boom 108. For example, the excavator stick 110 may be configured to curl relative to the excavator boom 108 about a curl axis C of the excavator 100. The excavator boom 108 and excavator stick 110 of the excavator 100 illustrated in FIG. 1 are linked by a simple mechanical coupling that permits movement of the excavator stick 110 in one degree of rotational freedom relative to the excavator boom 108. In these types of excavators, the linkage assembly heading N will correspond to the heading of the excavator boom 108. However, the present disclosure also contemplates the use of excavators equipped with offset booms where the excavator boom 108 and excavator stick 110 are linked by a multidirectional coupling that permits movement in more than one rotational degree of freedom. See, for example, the excavator illustrated in U.S. Pat. No. 7,869,923 ("Slewing Controller, Slewing Control Method, and Construction Machine"). In the case of an excavator with an offset boom, the linkage assembly heading N will correspond to the heading of the excavator stick 110.

The excavating implement 114 is mechanically coupled to the excavator stick 110. For example, referring to FIG. 1, the excavating implement 114 is mechanically coupled to the excavator stick 110 through an implement coupling 112. The excavating implement 114 may be mechanically coupled to the excavator stick 110 via the implement coupling 112 and configured to rotate about a rotary axis R. In an embodiment, the rotary axis R may be defined by the implement coupling 112 joining the excavator stick 110 and the rotary excavating implement 114. In an alternative embodiment, the rotary axis R may be defined by a multidirectional, stick coupling joining the excavator boom 108 and the excavator stick 110 along the plane P such that the excavator stick 110 is configured to rotate about the rotary axis R. Rotation of the excavator stick 110 about the rotary axis R defined by the stick coupling may result in a corresponding rotation of the rotary excavating implement 114, which is coupled to the excavator stick 110, about the rotary axis R defined by the stick coupling.

The guidance architecture 106 comprises one or more dynamic sensors, one or more linkage assembly actuators, and an architecture controller programmed to execute the steps of a control scheme, such as a control scheme 190 of FIG. 5A or a control scheme 200 of FIG. 5B, each of which are described in greater detail further below. The guidance architecture 106 may comprise a non-transitory computer-readable storage medium, such as memory, comprising machine readable instructions. The guidance architecture 106 may also comprise a processor communicatively coupled to the non-transitory computer-readable storage medium and configured to execute the machine readable instructions. The one or more linkage assembly actuators facilitate movement of the excavating linkage assembly 104. The one or more linkage assembly actuators comprise a hydraulic cylinder actuator, a pneumatic cylinder actuator, an electrical actuator, a mechanical actuator, or combinations thereof.

Figure 2A:
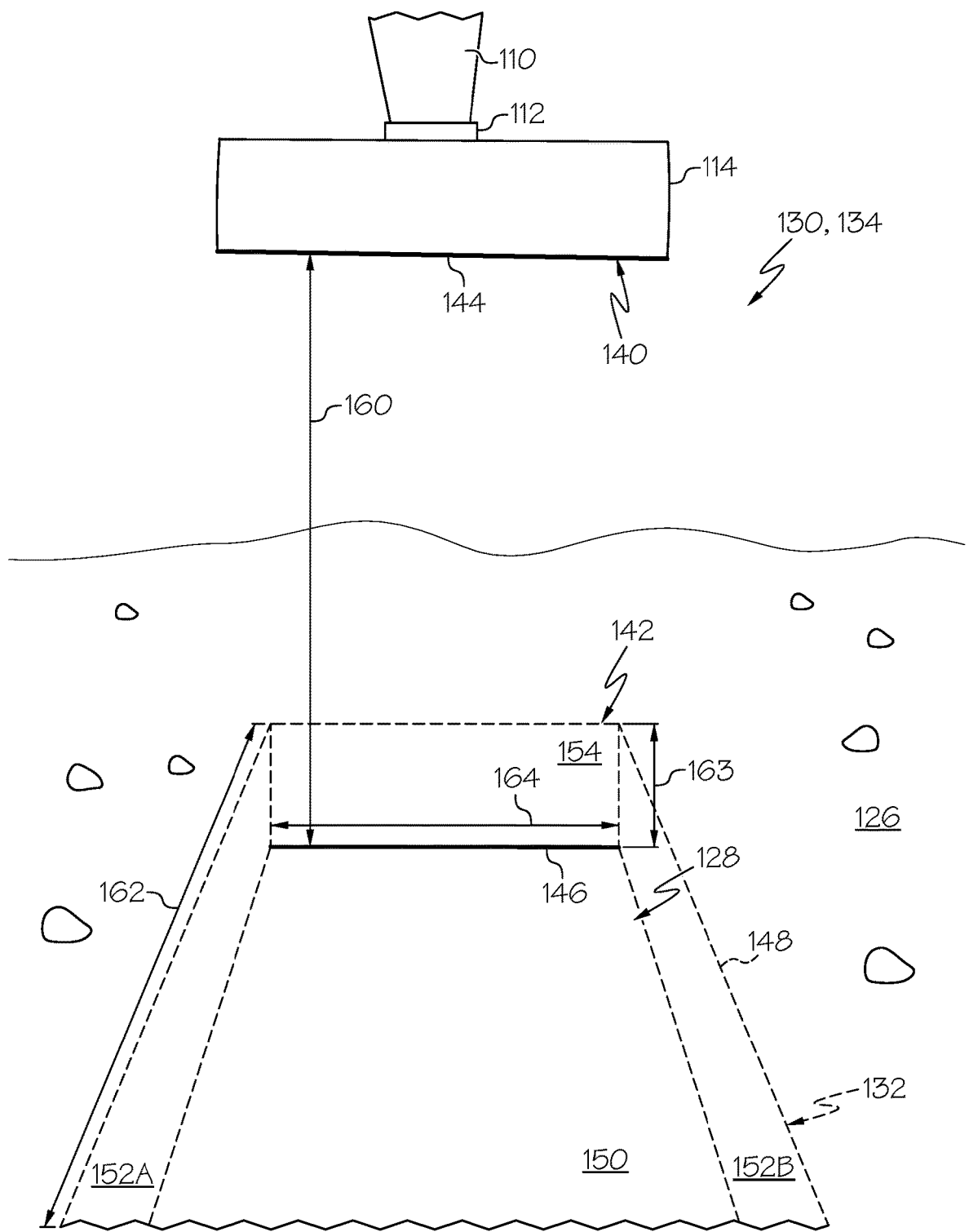
FIG. 2A is a schematic display view of an excavating implement of the excavator of FIG. 1 in a position with respect to a virtual trench and incorporating aspects of the present disclosure.
Figure 5A:
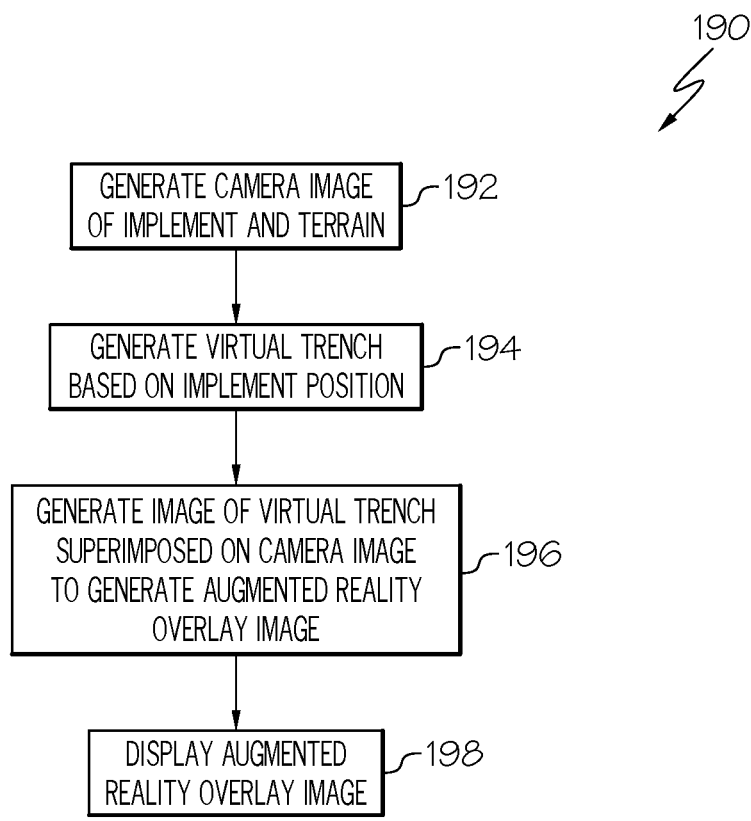
FIG. 5A is a flow chart illustrating a process that may be implemented by guidance architecture of the excavator of FIG. 1 to display an augmented reality overlay image according to aspects of the present disclosure.

In embodiments, and referring to FIG. 2A and a control scheme 190 of FIG. 5A, the architecture controller is programmed to generate an implement image 130 from the camera 124 in step 192. As an example and not as a limitation, the architecture controller is programmed to capture an implement image as the capture image 130, the implement image comprising the excavating implement 114 and terrain in the working area of the excavating implement 114. The implement image 130 comprises the excavating implement 114 in relation to the terrain 126. The architecture controller is further programmed to generate a virtual trench 132 configured to be disposed as part of the terrain 126 at least partially based on a position of the excavating implement 114 in step 194. In embodiments, the architecture controller may generate a signal indicative of the position and/or orientation of the excavating implement 114 and spacing with respect to terrain 126, as described in greater detail further below, from the one or more dynamic sensors 120, 122, 123. The architecture controller is further programmed to generate an image of the virtual trench 132 superimposed on the implement image 130 to generate an augmented reality overlay image 134 in step 196, and to display the augmented reality overlay image 134 on the display 125 in step 198. As a non-limiting example, FIG. 2A illustrates a view of an augmented reality overlay image 134 including the virtual trench 132 without underground features. In other embodiments, as illustrated in FIG. 2C, the view of an augmented reality overlay image 134A may be displayed with underground features. The architecture controller may be further programmed to generate the augmented reality overlay image to reveal underground features of the three-dimensional model within the virtual trench 132 and to occlude underground features of the three-dimensional model outside of the virtual trench 132.

For example, and referring to FIGS. 2C-4, the implement image 130 comprises the excavating implement 114 in relation to the terrain 126 and an augmented reality overlay image 134A, 134B, 134C displays a virtual trench 132 including underground features such as pipes 190, 192 for display on the display 125. As a non-limiting example, FIG. 2C illustrates a first view of such an augmented reality overlay image 134A.

Figure 2B:
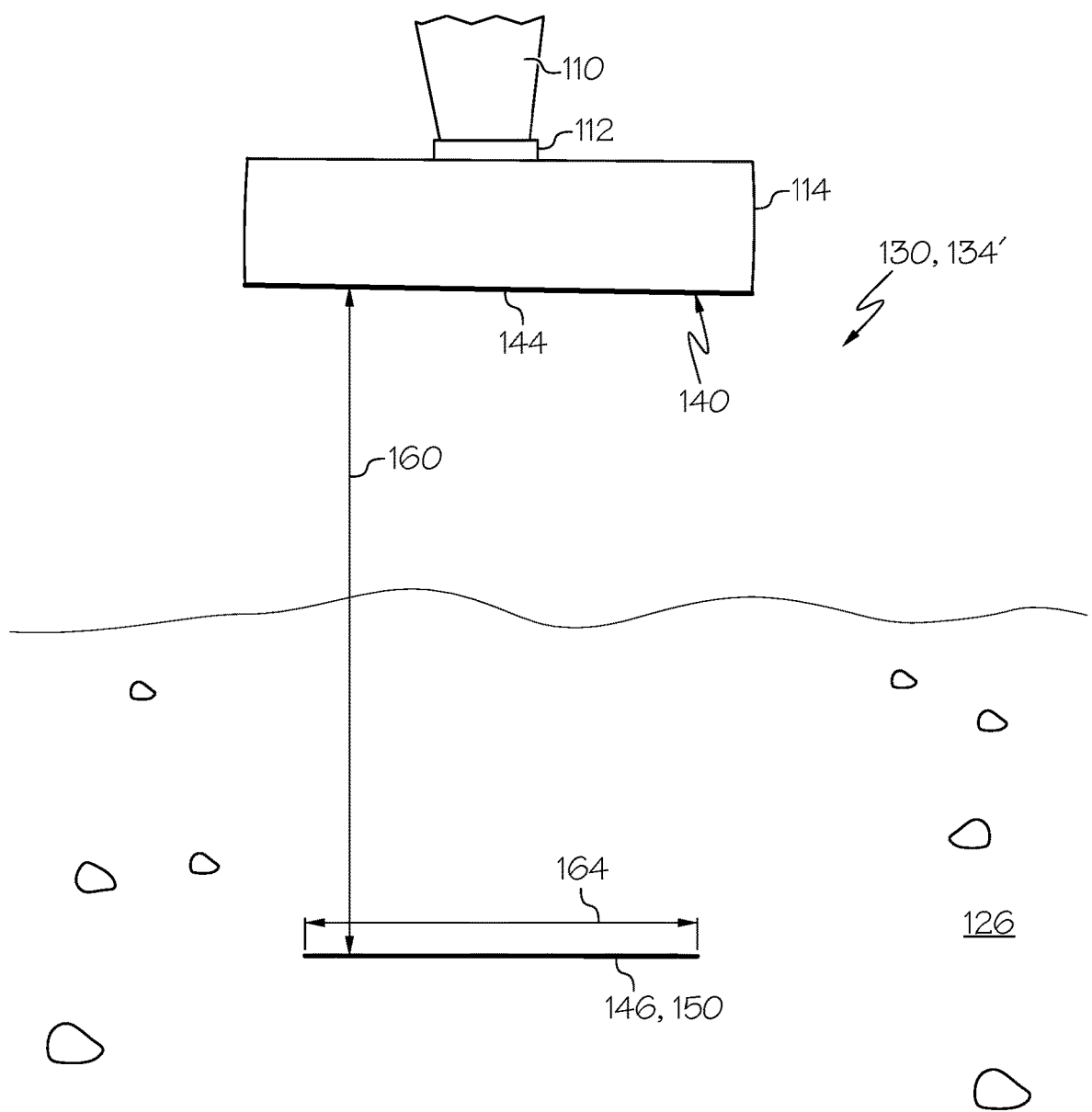
FIG. 2B is a schematic display view of an excavating implement of the excavator of FIG. 1 in a position with respect to a virtual implement bar and a virtual target bar of a design surface and incorporating aspects of the present disclosure
Figure 2C:
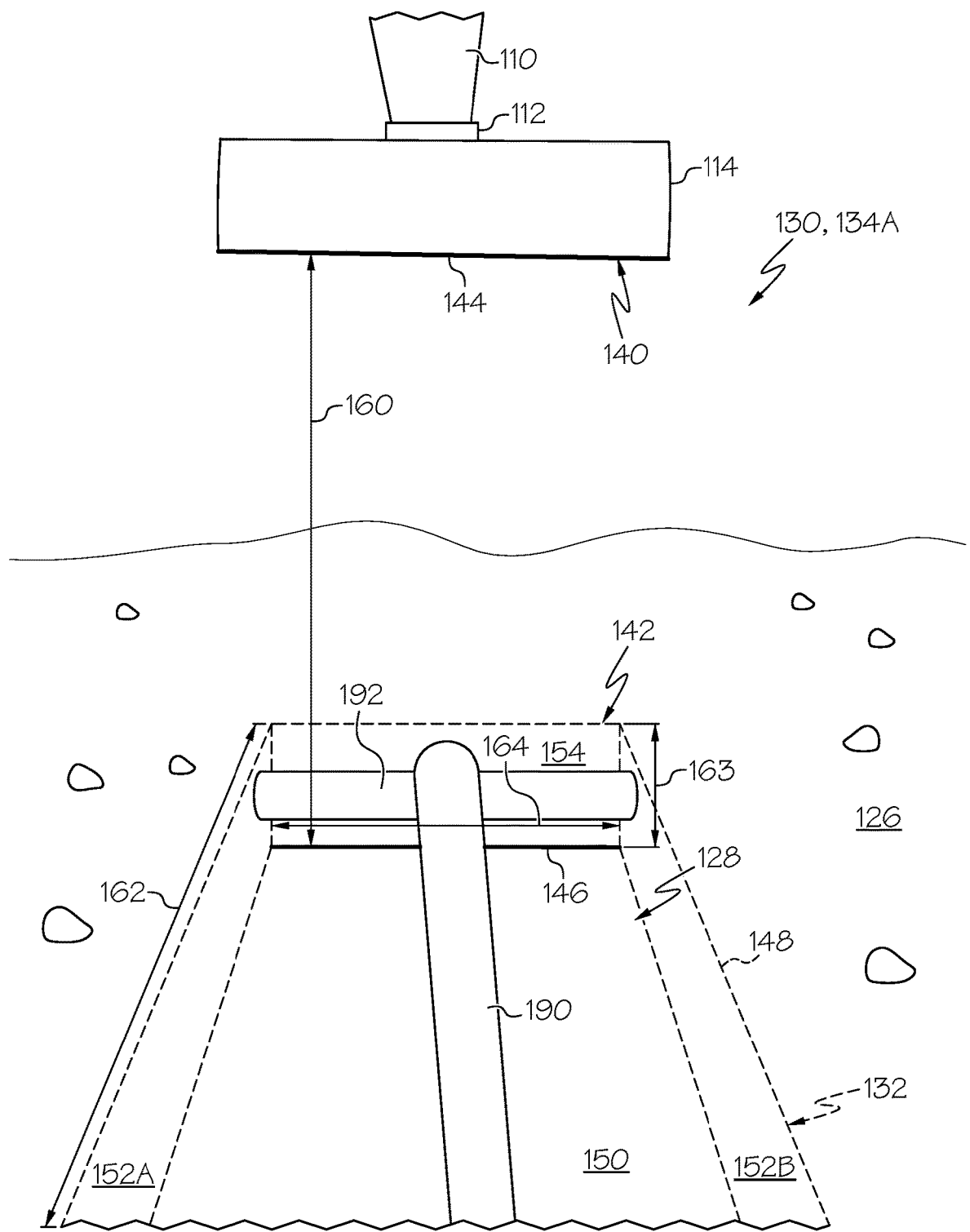
FIG. 2C is a schematic display view of an excavating implement of the excavator of FIG. 1 in a first position with respect to a virtual trench and underground features and incorporating aspects of the present disclosure.

In embodiments, as illustrated in FIGS. 2A-2B, the augmented reality overlay image 134, 134' may be displayed without underground features. For example, in FIG. 2B, the augmented reality overlay image 134' is displayed without the virtual trench 132 or the underground features while displaying a virtual target implement bar 144 and a virtual target bar 146 of a design surface 150, which are described in greater detail further below. In other embodiments, augmented reality overlay images may be displayed with one or more portions of the virtual trench 132 while omitting other one or more portions of the virtual trench 132, For example, a nearest trench boundary of the virtual trench 132 may be omitted from the display such that the virtual trench 132 appears to extend under the excavator 100 and outside of the view of the camera 124. Sub-visualizations and/or expandable visualizations of such augmented reality overlay images may be displayed, such as a first display as illustrated in FIG. 2C of the virtual trench 132 including underground features that may be narrowed to a display of the virtual trench 132 without underground features as displayed in FIG. 2A and/or that may be narrowed to a display of the virtual target bar 146 without the virtual trench 132 as displayed in FIG. 2B. Additionally, or alternatively, such displays may be expanded to add components and features as described herein and/or may be displayed in a shared screen space of the display 125.

As illustrated in FIG. 2C, the first view of an augmented reality overlay image 134A may be displayed with underground features. Referring to FIGS. 2C-4 and the control scheme 200 of FIG. 5B, the architecture controller is programmed to store geometry data of underground features of the terrain 126 in step 202. In embodiments, alternatively or additionally, the geometry data of underground features may be stored as two-dimensional and/or three-dimensional geometry information. Further, additional underground feature information may be stored by the architecture controller that may or may not match a display of a two-dimensional and/or three-dimensional model. As a non-limiting example, underground feature information of an underground feature, such as a pipe, may include two-dimensional and/or three-dimensional coordinates with respect to the start of the pipe and the end of the pipe. Further, the augmented reality overlay image 134A may include a shaded and/or curved extruded cylinder features to visually represent the pipe inserted between such coordinate points. In additional embodiments, the geometry data of the underground features may include two-dimensional and/or three-dimensional coordinates of end points or corners of the underground features, diameters of the underground features such as pipes or cables, and/or other dimensions such as dimensions of sumps as underground features.

Figure 5B:
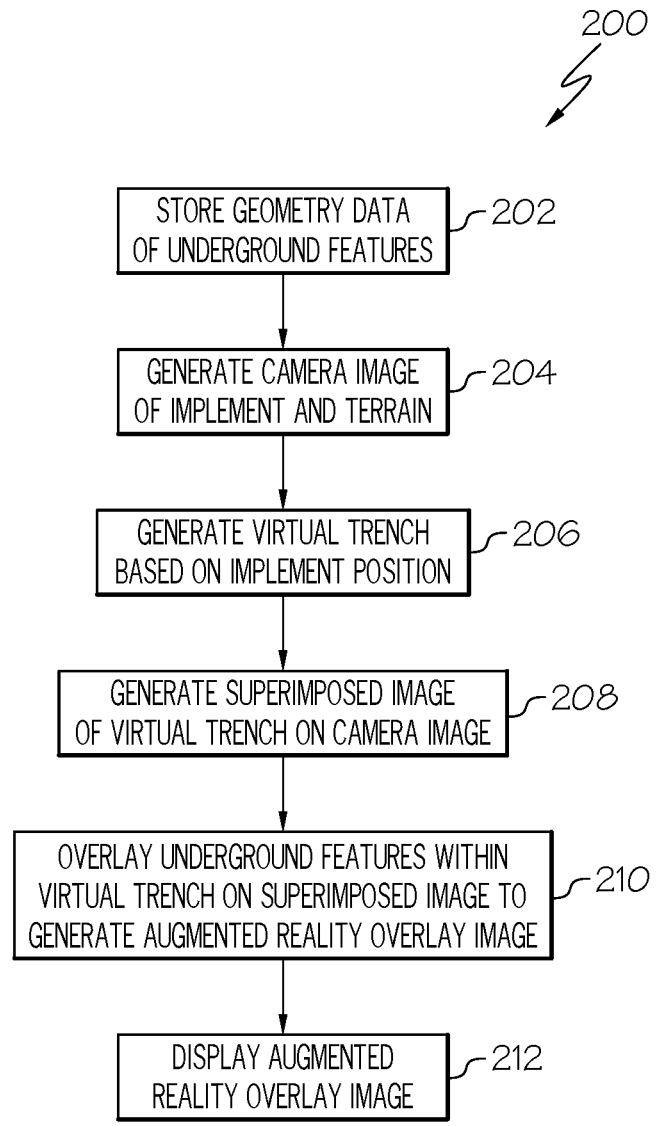
FIG. 5B is a flow chart illustrating another process that may be implemented by guidance architecture of the excavator of FIG. 1 to display an augmented reality overlay image according to aspects of the present disclosure.

In step 204 of the control scheme 200 of FIG. 5B, the architecture controller is programmed to generate an implement image 130 from the camera 124. As described above, the implement image 130 comprises the excavating implement 114 in relation to the terrain 126. Further, in step 206, the architecture controller is programmed to generate a virtual trench 132 configured to be disposed as part of the terrain 126 at least partially based on the position of the excavating implement 114. For example, the architecture controller may generate a signal indicative of the position and/or orientation of the excavating implement 114 and spacing with respect to terrain 126, as described in greater detail further below, from the one or more dynamic sensors 120, 122, 123.

Further, boundaries of the virtual trench 132 including one or more walls spaces defined between walls of the virtual trench 132 are determined such that, in step 208, the architecture controller is programmed to generate a superimposed image of the virtual trench 132 on the implement image. In steps 210 and 212, respectively, the architecture controller is programmed to overlay at least a portion of the underground features within virtual trench 132 on the superimposed image to generate an augmented reality overlay image 134A, 134B, 134C, and to display the augmented reality overlay image 134A, 134B, 134C on the display 125.

In embodiments, the underground features displayed in the virtual trench 132 may be truncated within a wall space defined by the virtual trench 132. In other embodiments, portions of the underground features beyond the boundaries of the virtual trench 132 may be displayed in a manner that differentiates such portions from the truncated underground feature portions displayed within the wall space as defined by the virtual trench 132. As a non-limiting example, an underground feature may include a pipe, and portions of the pipe that are displayed outside of the virtual trench 132 may include a different color and/or shading from a truncated portion of the pipe displayed within the virtual trench 132. Such visual differentiation may be indicative of a corresponding positional difference with respect to placement of a portion of the pipe inside the virtual trench 132 and placement of one or more portions of the pipe disposed outside the virtual trench 132.

Figure 3:
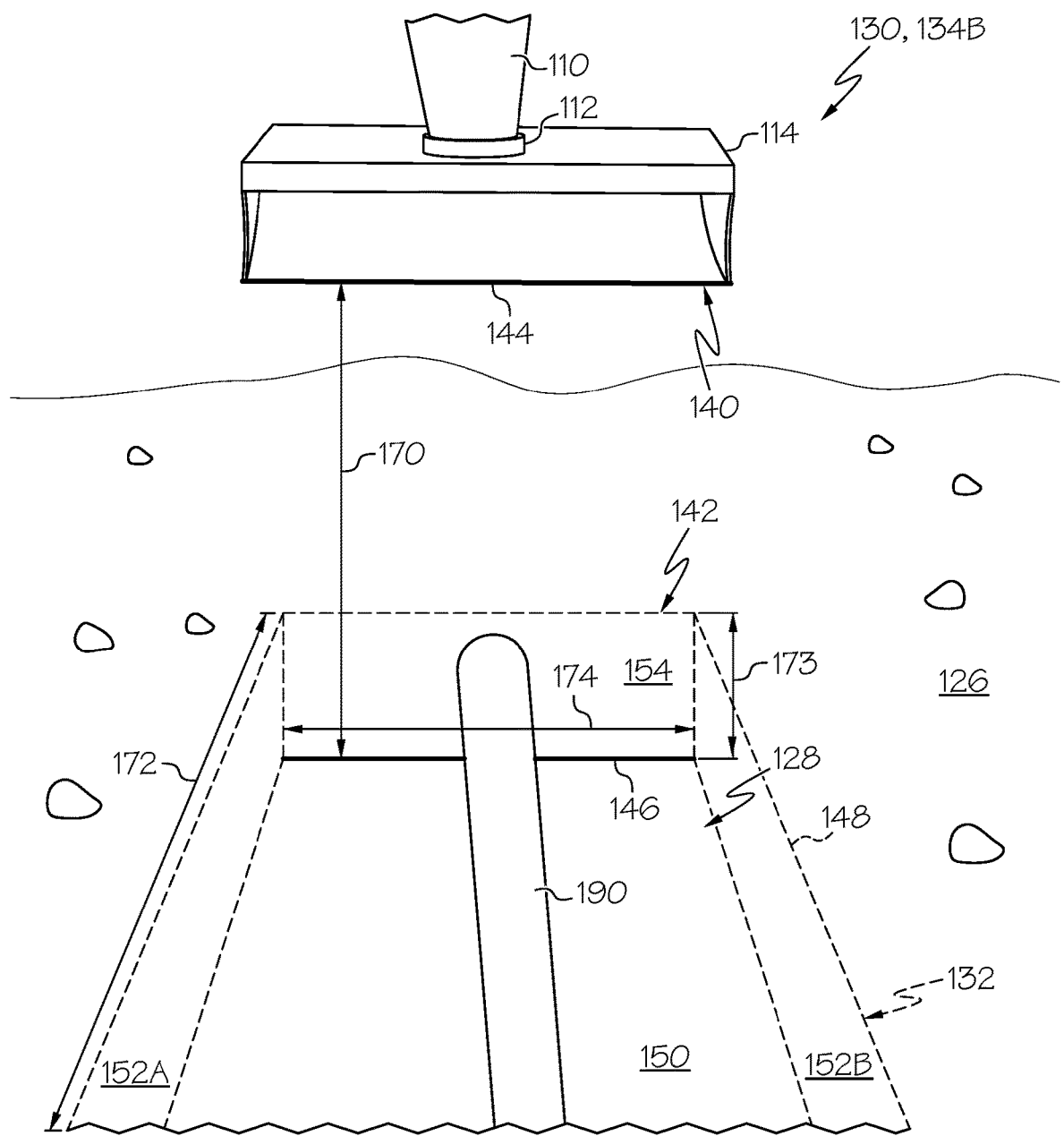
FIG. 3 is a schematic display view of an excavating implement of the excavator of FIG. 1 in a second position with respect to the virtual trench and underground features and incorporating aspects of the present disclosure.
Figure 4:
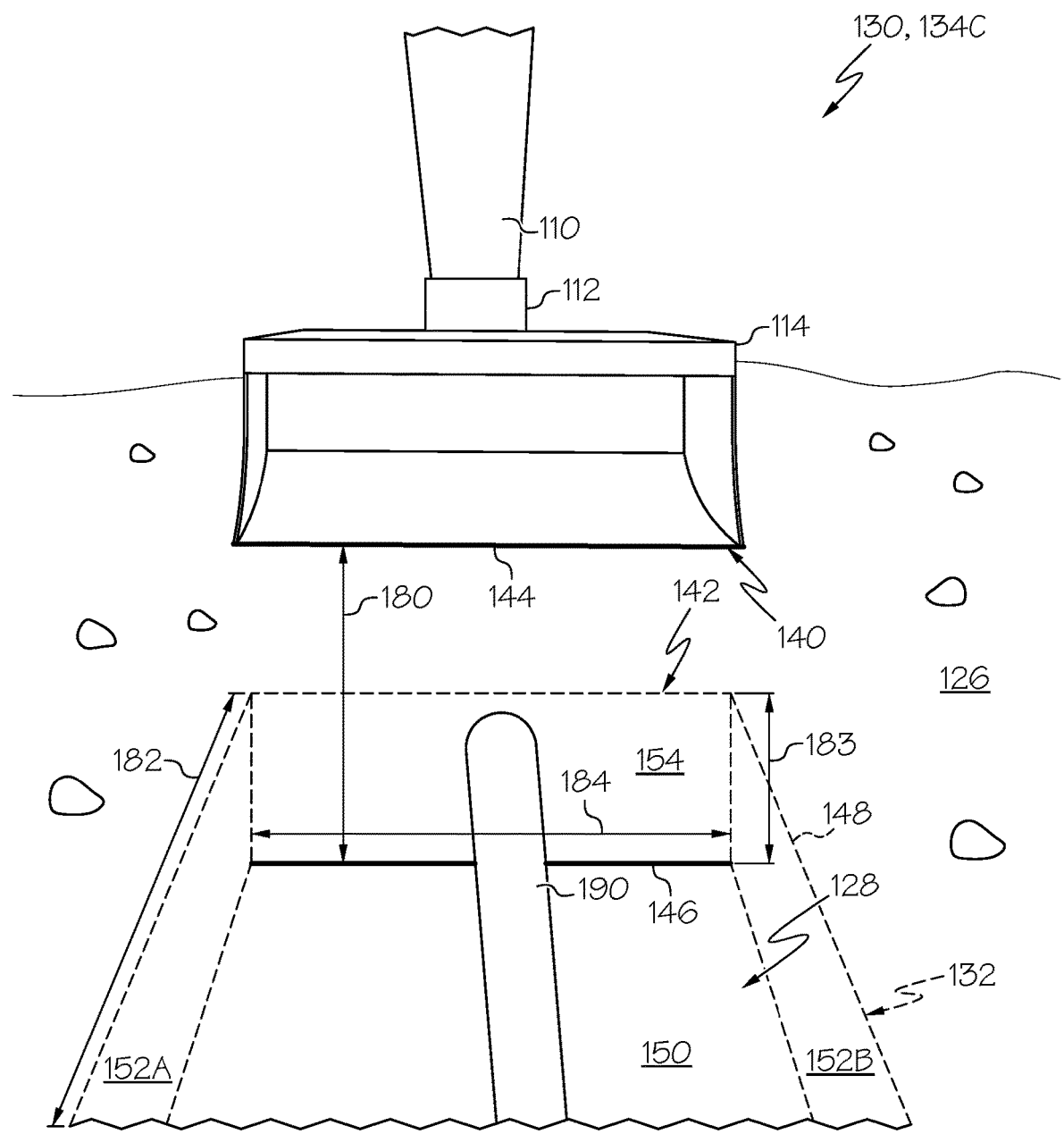
FIG. 4 is a schematic display view of an excavating implement of the excavator of FIG. 1 in a third position with respect to the virtual trench and underground features and incorporating aspects of the present disclosure.

As will be described in greater detail further below, FIG. 2C illustrates a first view of an augmented reality overlay image 134A. Further, FIG. 3 illustrates a second view of an augmented reality overlay image 134B, and FIG. 4 illustrates a third view of an augmented reality overlay image 134C. Referring to FIGS. 2C-4, in embodiments, a truncated portion 128 of the underground features is positioned within the virtual trench 132. The virtual trench 132 may be at least based in part on a position and/or orientation of a leading implement edge 140 of the excavating implement 114 in relation to a longitudinally disposed surface portion 142 of the terrain 126 that is disposed beneath the leading implement edge 140 of the excavating implement 114.

The augmented reality overlay image 134A, 134B, 134C may comprise a virtual implement bar 144 superimposed over the leading implement edge 140 of the excavating implement 114. The augmented reality overlay image 134A, 134B, 134C may further comprise a virtual target bar 146 superimposed over a bottom-most horizontal portion of a front wall 154 longitudinally extending from the longitudinally disposed surface portion 142 of the terrain 126 at a depth 163, 173, 183, as described in greater detail further below.

The virtual target bar 146 of the design surface 150 may be configured to adjust position in the augmented reality overlay image 134A, 134B, 134C based on a position of the virtual implement bar 144 with respect to the terrain 126 and/or a predetermined depth of cut associated with the design surface 150, for example. In embodiments, the design surface 150 is indicative of a bottom of the virtual trench 132 that has a farthest-from-the-viewer boundary at which the virtual target bar 146 is disposed. The design surface 150 may be a simple plane including a defined slope and/or direction, may include a road design, and/or may include a predetermined depth of cut.

FIGS. 2C-4 respectively show different bar spacings 160, 170, 180 between the virtual implement bar 144 and the virtual target bar 146 below the terrain 126. For each of FIGS. 2-4, a respective bar spacing 160, 170, 180 between the virtual implement bar 144 and the virtual target bar 146 is scalable with respect to a corresponding real world spacing between the leading implement edge 140 of the excavating implement 114 and a pre-determined depth of cut below the longitudinally disposed surface portion 142 of the terrain 126. Further, a respective adjustable length 162, 172, 182 of the pair of sidewalls 152A, 152B is directly proportional to the respective bar spacing 160, 170, 180, and a respective adjustable width 164, 174, 184 of the virtual target bar 146 is inversely proportional to the respective bar spacing 160, 170, 180. Thus, a width 164, 174, 184 of the virtual trench 132 may be adjusted by an amount inversely proportional to the bar spacing, and a length 162, 172, 182 of sidewalls 152A, 152B of the virtual trench 132 may be adjusted by an amount directly proportional to the bar spacing 160, 170, 180.

Further, an adjustable depth 163, 173, 183 of the front wall 154 of the virtual trench 132 is inversely proportional to the respectively bar spacing 160, 170, 180. As an example, and not as a limitation, a depth 163, 173, 183 of the virtual trench 132 may be adjusted by an amount inversely proportional to a bar spacing 160, 170, 180 between the virtual target bar 146 and the virtual implement bar 144. Thus, the closer the leading implement edge 140 is to the terrain 126 and virtual target bar 146, as indicated by bar spacings 160, 170, 180 between the virtual implement bar 144 and the virtual target bar 146, the shorter the virtual trench 132 appears in length with a greater depth and a longer width of the virtual target bar 146 at a rear portion of the virtual trench 132 disposed furthest away from a viewer, for example. Alternatively, the farther the leading implement edge 140 is moved from the terrain 126 and virtual target bar 146, as indicated by bar spacings 160, 170, 180 between the virtual implement bar 144 and the virtual target bar 146, the longer the virtual trench 132 appears in length with a shorter depth and a shorter width of the virtual target bar 146. Such visual adjustments may be indicative of changes in viewer perspective due to pixel width changes of the visual image, for example, and are not necessarily indicative of real-world changes in dimensions associated with the components described herein or the virtual trench 132.

For example, with respect to FIG. 2C, the augmented reality overlay image 134A includes a bar spacing 160, an adjustable length 162 of each of the pair of sidewalls 152A, 152B, and an adjustable width 164 of the virtual target bar 146. With respect to FIG. 3, in which the leading implement edge 140 is closer to the terrain 126 than in FIG. 2C, the augmented reality overlay image 134B includes a bar spacing 170 that is less than the bar spacing 160 of FIG. 2C. Additionally, FIG. 3 includes an adjustable length 172 of each of the pair of sidewalls 152A, 152B that is less than the adjustable length 162 of FIG. 2, and an adjustable width 174 of the virtual target bar 146 that greater than the adjustable width 164 of FIG. 2C. Similarly, in FIG. 4, in which the leading implement edge 140 is closer to the terrain 126 than in FIGS. 2C-3, the augmented reality overlay image 134C includes a bar spacing 180 that is less than the bar spacing 170 of FIG. 3. Further in FIG. 4, an adjustable length 182 of each of the pair of sidewalls 152A, 152B that is less than the adjustable length 174 of FIG. 3, and an adjustable width 184 of the virtual target bar 146 that greater than the adjustable width 174 of FIG. 3. Thus, in each of augmented reality overlay images 134A, 134B, 134C, as the virtual implement bar 144 moves closer to the virtual target bar 146 on the terrain 126, the dynamically adjustable views of the virtual trench 132 change to display a shortened adjustable length 162, 172, 182 of the pair of sidewalls 152A, 152B, a greater depth adjustable depth 163, 173, 183 of the front wall 154, and a greater adjustable width 164, 174, 184 of the virtual target bar 146. The architecture controller and/or an excavator operator may set a range of dimensions for display with respect to the virtual trench 132 as described herein. For the purposes of enhancing clarity in a 3D visualization of the virtual trench 132, for example, while the virtual trench 132 may appear to have an increased depth visually as the virtual implement bar 144 moves closer to the virtual target bar 146 on the terrain 126, a corresponding real-world depth illustrating underground features (as described in greater detail further below) in the virtual trench 132 may remain the same. As a non-limiting example, even though a depth 163 of the front wall 154 in FIG. 2C visually appears to be less than a depth 183 of the front wall 154 in FIG. 4, each of FIGS. 2-4 may correspond to a real-world depth of 5 feet from the terrain 126 to the virtual target bar 146. With respect to such examples, underground features within 5 feet from a surface of the terrain 126 are displayed, such as through illustrations as shown in FIGS. 2-4.

In embodiments, the virtual target bar 146 comprises a bottom-most portion of the front wall 154 of the virtual trench 132. The virtual trench 132 comprises a design surface 150 disposed beneath the longitudinally disposed surface portion 142 at a depth 163, 173, 183, a pair of sidewalls 152A, 152B with the design surface 150 disposed therebetween, and the front wall 154 disposed between the pair of sidewalls 152A, 152B and defining at the bottommost portion the virtual target bar 146. The adjustable width 164, 174, 184 of the virtual target bar 146 equals a width of the front wall 154 of the virtual trench 132. Boundaries of the virtual trench 132 including the design surface 150, the pair of sidewalls 152A, 152B, and the front wall 154 of the virtual trench 132 may be depicted as dashed lines 148 in the augmented reality overlay image 134A, 134B, 134C. In embodiments, the virtual target bar 146 at a bottom boundary of the front wall 154 may be depicted as a solid and/or bolded line. The virtual trench 132, including the virtual target bar 146 and the boundaries of the virtual trench 132, is configured to be dynamically adjusted and dynamically displayed based on the position and/or orientation of the virtual implement bar 144.

In an embodiment, with respect to a display of and within the augmented reality overlay image 134A, 134B, 134C, the virtual implement bar 144 comprises a solid red line. Further, the virtual target bar 146 may comprise a solid green line. The virtual trench 132 may be defined by a plurality of dashed lines 148 that are red in color or other suitable highlighting and differentiating color. It should be understood that other colors for such displayable components are within the scope of this disclosure.

In embodiments, and within the virtual trench 132, underground features are displayed that adjust along with the dynamic adjustment of the virtual trench 132 in the augmented reality overlay images 134A, 134B, 134C and that are truncated at walls of the virtual trench 132 to enable enhanced depth perception. The underground features may comprise, for example, portions of pipes and/or cables or like underground components truncated to be defined and positioned with the boundaries of the virtual trench 132 at least partially based on the stored geometry data of underground features. To further enhance depth perception, display of the underground features may be indicative of a spacing and/or distance of the underground features with respect to the wall boundaries of the virtual trench 132. For example, in FIG. 2C, a pipe 190 is displayed as nearer a surface of the terrain 126 than a pipe 192, while the pipe 192 is displayed as distanced farther from the surface of the terrain 126 and closer to the design surface 150. In embodiments, the virtual trench 132 may be displayed as described herein without a display of underground features.

The underground features may comprise at least one of a pipe 190 and cable disposed below the terrain. The virtual trench 132 may comprise at least a portion of the at least one of a pipe 190 and cable in the augmented reality overlay image 134A, 134B, 134C. In embodiments, the underground features comprise at least a pair of pipes 190, 192 disposed below the terrain 126. A first pipe 190 of the pair of pipes 190, 192 may be disposed above and at angle to a second pipe 192 of the pair of pipes 190, 192 as shown in the augmented reality overlay image 132A of FIG. 2C. For example, the first pipe 190 of the pair of pipes 190, 192 may be disposed perpendicular to the second pipe 192 of the pair of pipes 190, 192. One pipe of the pair of pipes 190, 192, such as the pipe 190 in FIG. 2C, may be disposed at an intersecting angle with respect to the front wall 154 of the virtual trench 132. The display of this angle may change depending on the display of the dimensions of the virtual trench 132 in the augmented reality overlay image 134A, 134B, 134C. Further, the virtual trench 132 may comprise at least a portion of each of the pair of pipes 190, 192 in the augmented reality overlay image 134A, as shown in FIG. 2C, in which each of the pair of pipes 190, 192 is displayed with a different color with respect to one another. For example, one pipe of the pair of pipes 190, 192, such as the pipe 190, may comprise a yellow color, and the other pipe of the pair of pipes 190, 192, such as the pipe 192, may comprise a green color.

It is contemplated that the embodiments of the present disclosure may assist to provide a more efficient method of excavation planning on site in a manner that minimizes a risk of human error in planning an excavation. For example, the embodiments described herein may assist to minimize a risk of human error in estimating and/or being aware of a positioning of underground features when excavating in real-time. The controller of the excavator or other control technologies may be improved with such augmented reality overlay images as described herein such that processing systems in connection with the augmented reality overlay images are enhanced and improved with respect to efficiency, speed, safety, production, and accuracy.

A signal may be "generated" by direct or indirect calculation or measurement, with or without the aid of a sensor.

For the purposes of describing and defining the present invention, it is noted that reference herein to a variable being "based on" a parameter or another variable is not intended to denote that the variable is exclusively based on the listed parameter or variable. Rather, reference herein to a variable that is "based on" a listed parameter is intended to be open ended such that the variable may be based on a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising." Likewise, one or more of the following claims utilize the term "based on," which similarly is an open-ended phrase that should be interpreted in like manner as the more commonly used open-ended preamble term "comprising."

What is claimed is:

1. A material moving machine comprising:
a material moving implement;
a camera positioned on the material moving machine and comprising a field of view that encompasses the material moving implement and terrain in a working area of the material moving implement;
an augmented display;
one or more dynamic sensors configured to generate a position signal representing a position of the material moving implement; and
an architecture controller programmed to
store a three-dimensional model of underground features of terrain in at least the working area of the material moving implement,
capture an implement image with the camera, the implement image comprising the material moving implement and terrain in at least the working area of the material moving implement,
generate a superimposed image by superimposing corresponding portions of the implement image and the three-dimensional model of underground features,
overlay a virtual trench on the superimposed image to generate an augmented reality overlay image, and
display the augmented reality overlay image on the augmented display.

2. The material moving machine of claim 1, wherein the architecture controller is programmed to generate the augmented reality overlay image to reveal underground features of the three-dimensional model within the virtual trench and to occlude underground features of the three-dimensional model outside of the virtual trench.

3. The material moving machine of claim 1, wherein the architecture controller is programmed to generate the virtual trench based on a position of a leading implement edge of the material moving implement in relation to a longitudinally disposed surface portion of the terrain disposed beneath the leading implement edge of the material moving implement.

4. The material moving machine of claim 3, wherein the architecture controller is programmed to generate the augmented reality overlay image to comprise:
a virtual implement bar superimposed over the leading implement edge of the material moving implement; and
a virtual target bar superimposed over the longitudinally disposed surface portion of the terrain and configured to adjust position in the augmented reality overlay image based on a position of the virtual implement bar with respect to the virtual target bar on the terrain.

5. The material moving machine of claim 4, wherein:
the virtual implement bar comprises a solid red line;
the virtual target bar comprises a bottom-most portion of the virtual trench as a solid green line; and
the virtual trench is defined by a plurality of dashed red lines.

6. The material moving machine of claim 4, wherein the architecture controller is programmed to generate the virtual trench such that the virtual target bar comprises a bottom-most portion of the virtual trench and the virtual trench comprises:
an underground surface;
a pair of sidewalls disposed between the underground surface; and
a front wall disposed between the pair of sidewalls and below the virtual target bar.

7. The material moving machine of claim 6, wherein the architecture controller is programmed to generate:
a bar spacing between the virtual implement bar and the virtual target bar that is scalable with respect to a corresponding real world spacing with the leading implement edge of the material moving implement and the longitudinally disposed surface portion of the terrain;
an adjustable width of the virtual target bar that is inversely proportional to the bar spacing; and
an adjustable length of the pair of sidewalls that is directly proportional to the bar spacing.

8. The material moving machine of claim 7, wherein the adjustable width of the virtual target bar equals a width of the front wall of the virtual trench.

9. The material moving machine of claim 6, wherein the architecture controller is programmed to depict boundaries of the underground surface, the pair of sidewalls, and the front wall of the virtual trench as dashed lines in the augmented reality overlay image.

10. The material moving machine of claim 3, wherein the architecture controller is programmed to adjust the virtual trench based on the position of the virtual implement bar.

11. The material moving machine of claim 1, wherein the architecture controller is programmed to dispose at least a pair of pipes comprising the underground features below the terrain.

12. The material moving machine of claim 11, wherein the architecture controller is programmed to dispose a first pipe of the pair of pipes above and at angle to a second pipe of the pair of pipes.

13. The material moving machine of claim 12, wherein the architecture controller is programmed to dispose the first pipe of the pair of pipes perpendicular to the second pipe of the pair of pipes.

14. The material moving machine of claim 13, wherein the architecture controller is programmed to:
generate the virtual trench to comprise at least a portion of each of the pair of pipes in the augmented reality overlay image; and
display each of the pair of pipes with a different color with respect to one another.

15. The material moving machine of claim 13, wherein the architecture controller is programmed to:
generate the virtual trench to comprise a front wall; and
dispose one pipe of the pair of pipes an intersecting angle with respect to the front wall of the virtual trench.

16. An excavator comprising:
an excavating implement;
a camera positioned on the excavator and comprising a field of view that encompasses the excavating implement and terrain in the working area of the excavating implement; and
control architecture comprising one or more dynamic sensors configured to generate a position signal representing a position of the excavating implement and an architecture controller programmed to
store a three-dimensional model of underground features of terrain in at least the working area of the material moving implement,
capture an implement image with the camera, the implement image comprising the excavating implement and terrain in at least the working area of the excavating implement, generate a superimposed image by superimposing corresponding portions of the implement image and the three-dimensional model of underground features, overlay a virtual trench on the superimposed image to generate an augmented reality overlay image, and display the augmented reality overlay image on the augmented display.

17. A method of operating a material moving machine utilizing an augmented display comprising:

disposing the material moving machine on terrain, the material moving machine comprising a material moving implement, a camera, the augmented display, and control architecture, wherein (i) the camera is positioned on the excavator and comprises a field of view that encompasses the material moving implement and terrain in a working area of the material moving implement, and (ii) the control architecture comprises one or more dynamic sensors configured to generate a position signal representing a position of the material moving implement;

storing a three-dimensional model of underground features of terrain in at least the working area of the material moving implement;

capturing an implement image with the camera, the implement image comprising the material moving implement and terrain in at least the working area of the material moving implement;

generating a superimposed image by superimposing corresponding portions of the implement image and the three-dimensional model of underground features;

overlaying a virtual trench on the superimposed image to generate an augmented reality overlay image; and displaying the augmented reality overlay image on the augmented display.

18. The method of claim 17, further comprising:

operating the material moving machine utilizing the control architecture to move the material moving implement with respect to the terrain based on the augmented reality overlay image.

19. The method of claim 18, further comprising:

generating the virtual trench based on a position of a leading implement edge of the material moving implement in relation to a longitudinally disposed surface portion of the terrain disposed beneath the leading implement edge; and generating the augmented reality overlay image comprising a virtual implement bar superimposed of a leading implement edge of the material moving implement, and virtual target bar superimposed over a longitudinally disposed surface portion of the terrain.

20. The method of claim 19, further comprising:

adjusting a position of the virtual target bar in the augmented reality overlay image based on a position of the virtual implement bar with respect to the virtual target bar on the terrain, adjusting a depth of the virtual trench by an amount inversely proportional to a bar spacing between the virtual target bar and the virtual implement bar;

adjusting a width of the virtual trench by an amount inversely proportional to the bar spacing; and adjusting a length of sidewalls of the virtual trench by an amount directly proportional to the bar spacing.

* * * * *

UNITED STATES PATENT AND TRADEMARK OFFICE
CERTIFICATE OF CORRECTION

PATENT NO. : 10,550,549 B2
APPLICATION NO. : 16/376126
DATED : February 4, 2020
INVENTOR(S) : Peter France, Gun Lee and Mark Billinghurst It is certified that error appears in the above-identified patent and that said Letters Patent is hereby corrected as shown below:

In the Specification

In Column 6, Line 8, after "heading", delete "N" and insert -- $\aleph$ --, therefor.

In Column 6, Line 20, after "heading", delete "N" and insert -- $\aleph$ --, therefor.

In Column 6, Line 29, after "heading", delete "N" and insert -- $\aleph$ --, therefor.

Signed and Sealed this
Twelfth Day of May, 2020

Andrei Iancu
*Director of the United States Patent and Trademark Office*